(12) United States Patent
Roseeuw

(10) Patent No.: US 8,262,839 B2
(45) Date of Patent: Sep. 11, 2012

(54) METHOD FOR MANUFACTURING PANELS AND PANEL HEREBY OBTAINED

(75) Inventor: Eveline Roseeuw, Gentbrugge (BE)

(73) Assignee: Flooring Industries Limited, SARL, Bertrange (LU)

( * ) Notice: Subject to any disclaimer, the term of this patent is extended or adjusted under 35 U.S.C. 154(b) by 0 days.

(21) Appl. No.: 12/600,073

(22) PCT Filed: May 9, 2008

(86) PCT No.: PCT/IB2008/001175
§ 371 (c)(1), (2), (4) Date: Aug. 31, 2010

(87) PCT Pub. No.: WO2008/139310
PCT Pub. Date: Nov. 20, 2008

(65) Prior Publication Data
US 2011/0008624 A1     Jan. 13, 2011

(30) Foreign Application Priority Data

May 15, 2007 (EP) .................................. 07009731

(51) Int. Cl.
*B29C 65/14* (2006.01)
(52) U.S. Cl. .................................................. 156/275.5
(58) Field of Classification Search ............... 156/306.6, 156/244.11, 244.27, 245, 297, 299, 306.9, 156/308.2, 309.9, 307.1, 331.1, 272.2; 428/411.1, 428/203, 204, 480, 483, 523, 500
See application file for complete search history.

(56) References Cited

U.S. PATENT DOCUMENTS

| | | | | |
|---|---|---|---|---|
| 3,540,978 A | * | 11/1970 | Ames | 428/325 |
| 3,661,673 A | * | 5/1972 | Merriam | 156/279 |
| 5,866,209 A | * | 2/1999 | O'Dell et al. | 427/288 |
| 6,040,044 A | * | 3/2000 | Takahashi et al. | 428/323 |
| 6,888,147 B1 | * | 5/2005 | Hansson et al. | 250/453.11 |
| 2009/0155593 A1 | * | 6/2009 | O'Brien et al. | 428/411.1 |

FOREIGN PATENT DOCUMENTS

| | | |
|---|---|---|
| EP | 1319524 A | 6/2003 |
| WO | WO 00/44984 A1 | 8/2000 |
| WO | WO 01/47726 A1 | 7/2001 |
| WO | WO 01/96688 A1 | 12/2001 |
| WO | WO 2006/074754 A | 7/2006 |
| WO | WO 2006/074754 A1 | 7/2006 |

OTHER PUBLICATIONS

Search Report of European Patent Office regarding European Patent Application No. EP 07 009731 Oct. 16, 2007.

* cited by examiner

*Primary Examiner* — Daniel McNally
(74) *Attorney, Agent, or Firm* — Bacon & Thomas, PLLC

(57) ABSTRACT

Method for manufacturing panels, wherein these panels are composed at least of a substrate and a top layer, which includes at least one material sheet, wherein for said material sheet use is made of a material sheet which previously is provided with a radiation-hardening covering layer, in which hard particles are included.

8 Claims, 4 Drawing Sheets

METHOD FOR MANUFACTURING PANELS AND PANEL HEREBY OBTAINED

BACKGROUND OF THE INVENTION

1. Field of the Invention

This invention relates to a method for manufacturing panels, as well as to panels obtained by means of such method.

2. Related Art

In particular, the invention relates to a method for manufacturing covered panels, wherein the obtained panels are of the type comprising a substrate with a top layer provided thereon on the basis of at least one material sheet. Such covered panels mostly are also indicated as laminate panels and may be applied as a floor panel, furniture panel, wall panel, ceiling panel or the like. Therein, the aforementioned top layer is provided with a print or coloration. Such print may be provided directly on the substrate, whether or not by the intermediary of primers, however, may also be provided on a material sheet which then forms part of said top layer. When relating to a coloration, this may, for example, concern a material sheet comprising coloring agents, such as paint.

It is known that press treatments may be used for manufacturing laminate panels. Substantially, two manufacturing ways for laminate panels are known from prior art, in which each time at least one press treatment is applied.

According to a first possibility, laminate panels may be manufactured by means of a so-called DPL process (Direct Pressure Laminate), wherein one or more material sheets provided with resin, for example, paper sheets, together with a substrate, for example, a wood-based substrate, are brought into a press, where, by means of a press element, such as a press plate, they are exposed to an increased pressure and temperature and in this manner are mutually bonded to form a covered substrate, which then may be processed to any panel. For forming the final panel starting from said covered substrate, for example, sawing and/or milling operations may be applied and, for example, the edges of these panels may be provided with a profile or be covered.

According to a second possibility, the laminate panels may be manufactured by means of a so-called HPL process (High Pressure Laminate), wherein several material sheets first are consolidated before being provided, for example, glued, onto a substrate. In the case of HPL, the mutual bond among the material sheets, just as with DPL in the cases where a plurality of material sheets are applied, by solidifying at least a portion of the present resin, which preferably, as aforementioned, is provided on and/or in at least one material sheet.

From the state of the art, for example, with floor or furniture applications, it is known to provide hard particles in the laminate with the intention of obtaining a certain wear and/or scratch resistance at the surface of the panel. According to the state of the art, these particles may be provided in various possible manners. According to a first possibility, they are comprised in the resin provided on the material sheets. According to a second possibility, they are provided on the panels or boards, which already are provided with a print or coloration, by means of a lacquer or UV covering layer comprising such particles. An example of said first possibility is described, for example, in WO 00/44984. An example of said second possibility is described, for example, in WO 01/47726.

SUMMARY OF THE DISCLOSURE

The invention aims at an alternative method with which such hard particles may be provided in the top layer of a covered panel. To this aim, the invention relates to a method for manufacturing panels, wherein these panels are composed at least of a substrate and a top layer, said top layer comprising at least one material sheet, with the characteristic that for said material sheet, use is made of a material sheet, which has been previously provided with a radiation-hardening covering layer in which hard particles are comprised. By "previously" is meant preceding the composition of the panels and thus preceding the treatment step by which the substrate is provided with said top layer. Preferably, said covering layer previously also is hardened at least partially and still better completely.

The inventors have found that the application of a radiation-hardening covering layer on the material sheet before, at least on the basis of this material sheet, providing or forming a top layer on a substrate may offer various advantages. Compared to said second possibility for applying hard particles, the higher flexibility of such material sheet in comparison with a quasi-finished panel may be used for simplifying the required production facilities for the application of a radiation-hardening covering layer. Moreover, by means of the usual mechanical techniques, any structure, relief or other impressions, for example, wood pores and/or wood nerves, may be provided in the upper side of the panels. For a description of these techniques, reference is made to WO 01/96688. The inventors have found that with a radiation-hardening covering layer in comparison to said first possibility a significantly better scratch resistance of the top layer may be achieved.

It is clear that in general any substance that can be hardened by means of radiation may be applied for said covering layer. Preferably, electromagnetic radiation is used for hardening, with radiation frequencies that are higher than the frequency of visible light. So, for example, use may be made of a substance that can be hardened by means of UV (ultraviolet) light, which, for example, is completely or partially hardened by means of UV lamps, or a substance that can be hardened by means of electron beams. Said hard particles may be comprised in the still unhardened substance or may be blended therein before providing this substance on the respective material sheet, and/or may be provided in the still unhardened covering layer after the radiation-hardening substance of this covering layer has been provided partially and preferably already for the major part thereof on the material sheet, for example, by jetting, spraying, spreading or providing the hard particles on this substance in any other manner. Anyhow, it is preferred that the respective substance has not yet completely hardened, or at least is not completely hardened before the hard particles are provided therein.

As an UV- or electron beam-hardening substance, use may be made of a lacquer, such as an acrylic, epoxy or maleimide lacquer. The reaction mechanism preferably is chosen from the group of cationic reaction mechanism, reaction by means of free radicals and reaction by means of thiolene. Preferably, the substance is free from photo initiators.

It is clear that the covering layer may be provided in one or more steps, wherein then possibly intermediate drying steps are performed. The hard particles then possibly may be concentrated layer-like in the covering layer.

Preferably, said material sheet, when the covering layer is applied, already is provided with synthetic material. Herein, for example, a thermo-hardening or a thermo-plastic resin may be chosen. As a thermohardening resin, an amino resin, such as a melamine resin, may be used. Providing, in a previous step, this material sheet with this synthetic material may be performed in any manner. For example, the material sheet may be soaked in this synthetic material, or the synthetic material can be jetted on, or the like. Before the substance of the covering layer is applied, a drying treatment may or may not be performed on the material sheet, for example, with the intention of drying out or hardening the already provided synthetic material completely or partially. Preferably, the material sheet, when the substance of the covering layer is applied, has a moisture content that is lower than 15 percent, and still better is lower than 10 percent. A good value is, for example, a moisture content of approximately 6 percent. Said drying treatment preferably is performed by means of an oven, such as a hot-air oven. It is noted that, apart from at least partially hardening the substance of the covering layer by means of radiation, the respective material sheet is preferably subjected to an additional drying treatment, either before the substance of said covering layer is applied, or before this covering layer is completely or partially hardened, or after the substance of said covering layer is applied, or after said covering layer is already completely or partially hardened. Preferably, the application of the covering layer takes place on the same line as the treatment by which the respective material sheet is provided with synthetic material beforehand.

It is self-evident that the application of the covering layer may be performed per material sheet, as well as may be performed on larger webs of material, from which then, by division, a plurality of said material sheets may be obtained. The possible prior resin-treatment preferably is performed on such material webs.

Preferably, said hard particles relate to ceramic or mineral particles. Thus, for example, use can be made of hard particles chosen from the group of aluminum oxide, silicon carbide, silicon oxide, silicon nitride, tungsten carbide, so-called SIALON, boron carbide, and titanium oxide, or from any other metal oxide, metal carbide, metal nitride or metal carbonitride. In principle, a variety of particles may be used; preferably, they are harder than the actual substance of the radiation-hardening covering layer after the latter has hardened. Of course, also any mixture of the above-mentioned hard particles may be applied.

Preferably, said hard particles have an average grain size situated between 30 nanometers and 300 micrometers. In order to obtain a good scratch resistance and/or wear resistance in combination with a good transparency of the covering layer, one preferably works with an average grain size between 300 nanometers and 30 micrometers. One may work solely with rather small particles having an average grain size which is smaller than or equal to 10 microns, or work solely with rather large particles having an average grain size which is larger than 10 microns, as well as with a mixture of smaller and larger particles.

The particles may have any shape, and, apart from a random shape, may also have a substantially spherical, flat or oblong shape. Thus, for example, one may work with glass spheres, flat corundum or cellulose fibers.

The method of the present invention preferably is used for manufacturing panels, wherein said covering layer with the hard particles provided therein forms the upper side of the final panel. By this is meant that preferably there are no further material sheets above this covering layer. Possibly, in fact one or more further layers of hardened substance may be formed above the respective covering layer. According to the invention, it is of course not excluded that the covering layer is protected further by means of one or more extra material sheets, whether or not provided with resin or other synthetic material. Possibly, such extra material sheet may also comprise hard particles. In the final panel, the radiation-hardened covering layer may also be protected further by a layer of resin. It is noted that in the covering layer and/or in the further layers possibly provided thereupon, structure, relief or other impressions may be provided, for example, with the intention of creating a surface geometry at the upper side that corresponds to the aforementioned print. Thus, for example, a wood structure may be provided, which corresponds to a print in the form of a wood pattern.

In a preferred form of embodiment, said step of taking up said material sheet into said top layer is performed by means of a press treatment. Thus, for example, the DPL or HPL process described in the introduction may be applied. It is clear that first, larger boards may be formed, from which then the panels are obtained at least by dividing these boards. Preferably, during said press treatment the top layer or the components thereof are bonded to the substrate, such as it is the case with a DPL process. By means of such press treatment, said impressions in the upper side of the boards or panels may also be formed.

For the substrate, preferably use is made of wood-based materials, such as particle board, MDF or HDF (Medium Density Fiberboard or High Density Fiberboard), Oriented Strand Board (OSB) or the like. Also, use can be made of boards of synthetic material or boards hardened by means of water, such as cement boards.

The material sheet may relate, for example, to a so-called overlay or a so-called decor layer, wherein in this latter case said print is applied on the material sheet and/or a coloration of this material sheet is performed. According to the invention, it is, of course, not excluded to work with a colored overlay.

When the material sheet, upon which said covering layer is provided, relates to a so-called decor layer, said print preferably is provided on this material sheet and this material sheet, in the final panel, preferably, however, not necessarily, is further protected by a synthetic material-containing, wear-resistant layer, which as such may or may not comprise a material sheet, such as an overlay. As a synthetic material for the wear-resistant layer preferably a thermo-hardening resin, such as a melamine resin, is applied. Of course, thermoplastic resins are not excluded. From the above, it is clear that such decor layer may also be applied as the sole material sheet or at least as the uppermost material sheet in the top layer of the covered panel. As a material sheet, for a decor layer preferably a sheet, such as a paper sheet, is applied with a weight between 65 and 150 grams per square meter, and still better between 75 and 100 grams per square meter.

When the material sheet, upon which said covering layer is provided, relates to a so-called overlay, then preferably a print or coloration is used, which is situated below this overlay and which, for example, is applied in an underlying material sheet, such as a decor layer. It is clear that the print may also be provided on the substrate, possibly with the intermediary of one or more primers. As a material sheet, for an overlay preferably a sheet, such as a paper sheet, is applied with a weight between 10 and 30 grams per square meter, and still better between 15 and 25 grams per square meter. In the case of a paper sheet, preferably use is made of an alpha-cellulose paper. Such paper, as this may be the case, for example, in a DPL process, may become transparent when being pressed, even if according to the present invention a radiation-hardening covering layer is used.

Apart from paper sheets of any weight, also textile or other fabric layers may be used for said material sheets.

Generally, it is acknowledged that the inventor has found that applying, according to the invention, a radiation-hardening covering layer on a material sheet may take place without or almost without any influence onto the visibility of an underlying print or coloration, even in the cases where this material sheet is subjected to a press treatment, such as this is the case with a DPL process.

The thickness of said covering layer preferably is limited to maximum 10 micrometers. For example, covering layers of 3 micrometers or less may be used. Preferably, 5 to 200 grams per square meter of the radiation-hardening substance, and still better 10 to 50 grams per square meter are used.

It is noted that apart from the hard particles, still further, for example, solid additives may be used in the covering layer, such as, for example, cellulose fibers or polyurethane particles. The latter may provide, for example, for a smooth feel when touching the respective covering layer.

It is clear that the method of the invention may be applied for manufacturing panels, which, apart from said hard particles situated in the radiation-hardening covering layer of the respective material sheet, also have other hard particles in the top layer, preferably at a location where they are situated above said print or coloration. Said other hard particles then are situated preferably in a material layer formed by a material sheet and/or a synthetic material, such as resin. In the first case, herein this may or may not concern the material sheet having the radiation-hardening covering layer. In the second case, this may concern the synthetic material, which, as aforementioned, is provided on the material sheet having the radiation-hardening covering layer in a prior step. Said other particles preferably have a larger average grain size than the hard particles situated in the radiation-hardening covering layer. A very useful combination is obtained when the hard particles in the radiation-hardening covering layer have a rather small grain size, this is, for example, smaller than or equal to 10 micrometers and still better smaller than 1 micrometer, and the other particles have a rather large grain size, this is, for example, larger than 10 micrometers and still better larger than 50 micrometers and preferably smaller than 150 micrometers. This combination may be performed, for example, by providing said covering layer at one side of the material sheet and providing the other hard particles, possibly comprised in a resin layer, at the other side of the respective material sheet.

Of course, for said other hard particles use can be made of any particles having a hardness that is larger than the hardness of the material in which they are situated. Preferably, use is made of the above-mentioned ceramic or mineral materials.

Further, it is clear that the invention also relates to panels obtained by means of a method according to the invention. Herein, this may relate, for example, to a floor panel, a furniture panel, a wall panel or a ceiling panel. The invention also relates to material sheets which can be applied for manufacturing such panels, with the characteristic that these material sheets are provided with an at least partially hardened radiation-hardening covering layer in which hard particles are comprised and which preferably are obtained as a semi-finished product when implementing a method in accordance with the invention.

BRIEF DESCRIPTION OF THE DRAWINGS

With the intention of better showing the characteristics of the invention, hereafter, as an example without any limitative character, several preferred embodiments are described, with reference to the appended drawings, in which.

DETAILED DESCRIPTION OF PREFERRED EMBODIMENTS OF THE INVENTION

Figure 1:
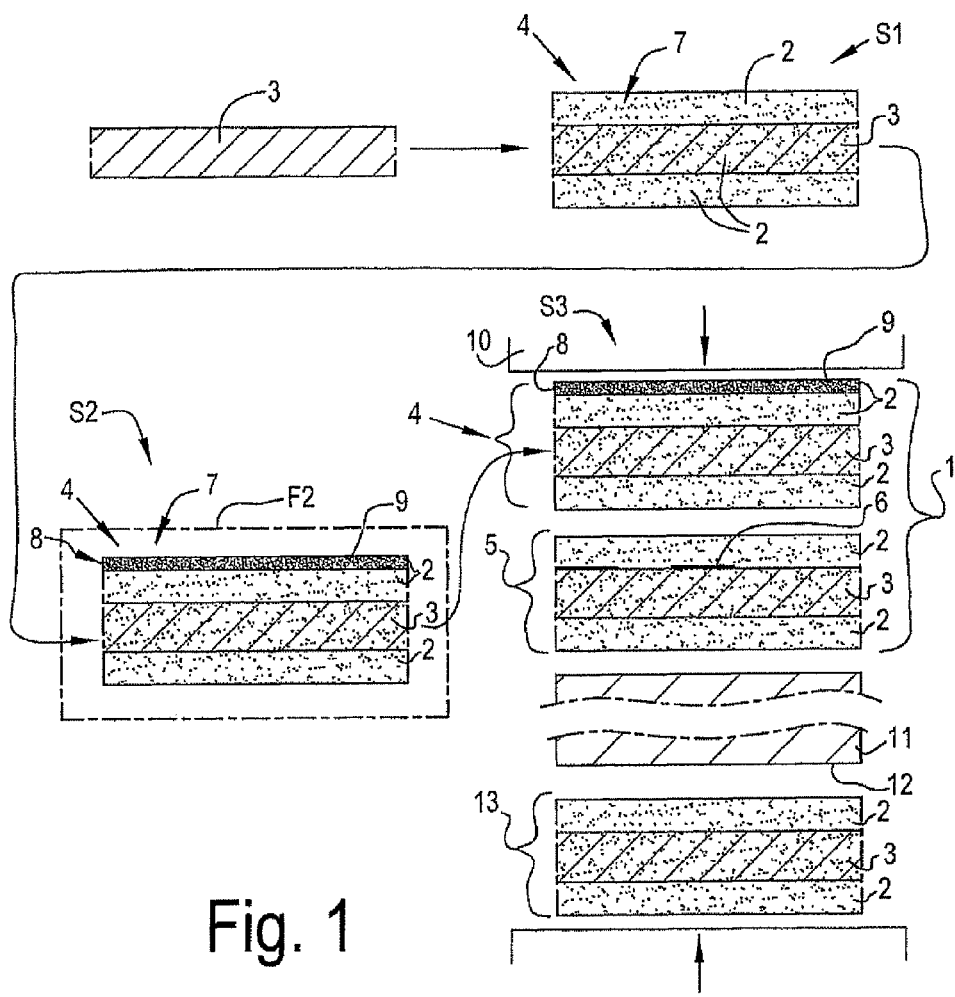
FIG. 1 represents a method according to the invention.

FIG. 1 represents different steps in a method for manufacturing a panel, such as a floor panel. Herein, this relates to a laminate panel with a top layer 1, which, amongst others, is composed of two material sheets 3 provided with resin 2. A first material sheet 3 provided with resin 2 forms a so-called overlay 4 and is intended for forming, in the example, the upper side of the panel to be manufactured. This overlay 4 extends above a second material sheet 3, which, provided with resin 2, forms a decor layer 5 or decor paper. To this aim, the second material sheet 3 has a print 6 forming a printed decor. It is clear that instead of working with a print 6, also a coloration of the respective material sheet 3 by means of coloring agents, such as paint, may be applied.

FIG. 1 clearly shows that the first material sheet 3, which is intended to form the overlay 4, in a first step S1 may be provided with resin 2 or another synthetic material, such that this material sheet 3 has an amount of resin 2 or synthetic material at least at its upper side 7. In this case, the material sheet 3 has been completely saturated with resin 2 and shows an amount of resin 2 at is underside, too. In a second step S2, at the upper side 7 of the already resin-pre-treated first material sheet 3 or overlay 4 an at least partially hardened, radiation-hardening covering layer 8 is provided, the latter comprising hard particles 9. By the upper side 7, the side of the material sheet 3 is intended which, in the top layer 1, will be directed towards the upper side of the final panel. It is clear that the covering layer 8 herein may be applied in any manner, for example, by means of rollers, wherein metering may or may not be performed.

For forming the laminate panel, in the example of FIG. 1 the DPL technique mentioned in the introduction is applied, wherein, as represented in step S3, said overlay 4 provided with a covering layer 8, and said decor layer 5, are consolidated on a basic board 11 or substrate 11 by means of a press element 10. In this case, at the underside 12 of the basic board 11, which latter may consist, for example, of an MDF or HDF board, also a material sheet 3 provided with resin 2 is provided, said sheet forming a so-called balancing layer or backing layer 13.

It is noted that in step S3 preferably relatively large boards are formed, which subsequently may be sawed to smaller panels, wherein, amongst others, in the case of floor panels, coupling means may be provided at the edges. In the case of furniture panels or other panels, coverings may be provided at the respective edges, for example, by applying previously manufactured decor strips and/or by applying a print by means of a printing technique, such as transfer printing or pad printing.

It is clear that by means of the method illustrated in FIG. 1, panels are obtained comprising hard particles at the upper surface, which particles, due to the fact that they are comprised in a radiation-hardening covering layer and are provided on the material sheet itself, impart to these panels the advantages mentioned in the introduction.

Figure 2:
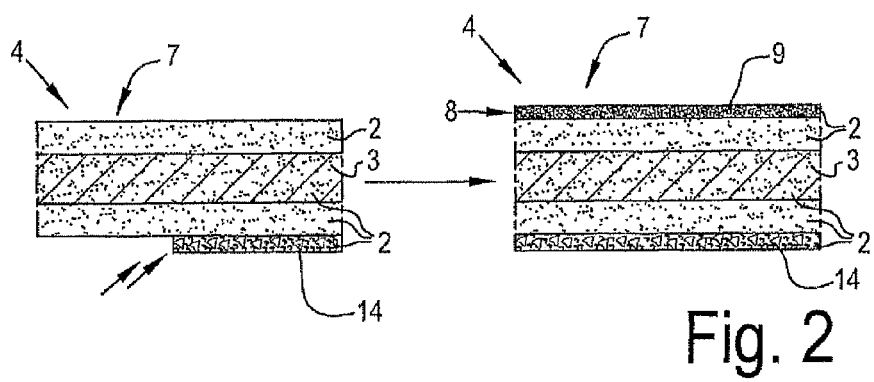
FIG. 2 represents a variant of such method for the area indicated by F2 in FIG. 1.

FIG. 2 represents that according to a variant, hard particles 14 may also be provided on the underside of the first material sheet 3 or overlay 4. These particles may be provided by means of a resin suspension and, as illustrated, preferably are of a larger average size than said hard particles 9 comprised in the covering layer 8.

Figure 3:
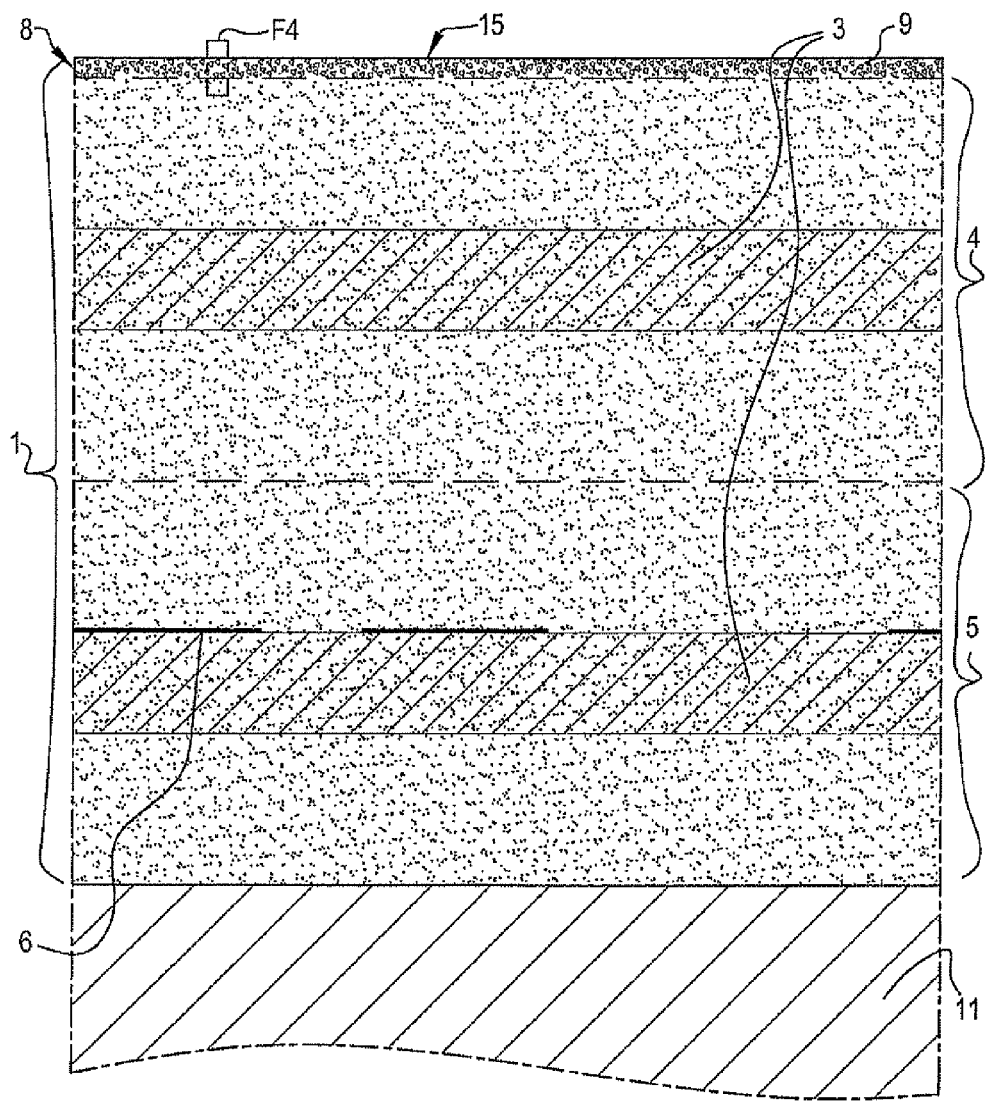
FIGS. 3 and 4 represent a cross-section through the top layer of a panel manufactured by such method, wherein FIG. 4, at a larger scale, represents a view onto the area indicated by F4 in FIG. 3.

FIG. 3 represents a cross-section through the top layer 1 of the laminate panel obtained by the method of FIG. 1. In this laminate panel, the surface 15 of the top layer 1 is formed by the covering layer 8 and the hard particles 9 comprised therein.

Figure 4:
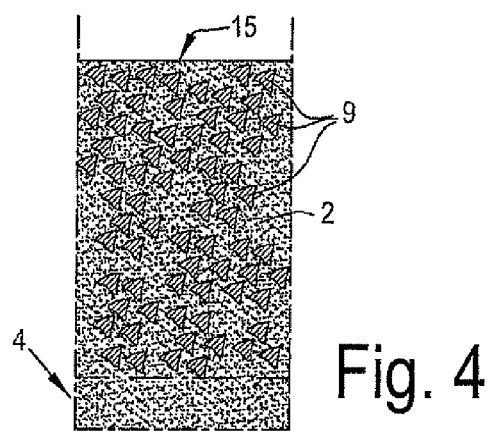

FIG. 4 represents that particularly high concentrations of the hard particles 9 may be achieved at the surface 15 of a laminate panel, as a consequence of which these particles 9 may be particularly effective. Generally, for example in the case of a floor panel, preferably an overall concentration of hard particles between 3 and 30 grams per square meter and still better between 5 and 15 grams per square meter is used, including possible hard particles situated at another location in the top layer than in said radiation-hardened covering layer 8, however, situated above said print or coloration. According to the invention, it is of course not excluded to work with concentrations of hard particles that are lower than 3 grams per square meter or are higher than 30 grams per square meter.

Figures 5, 6:
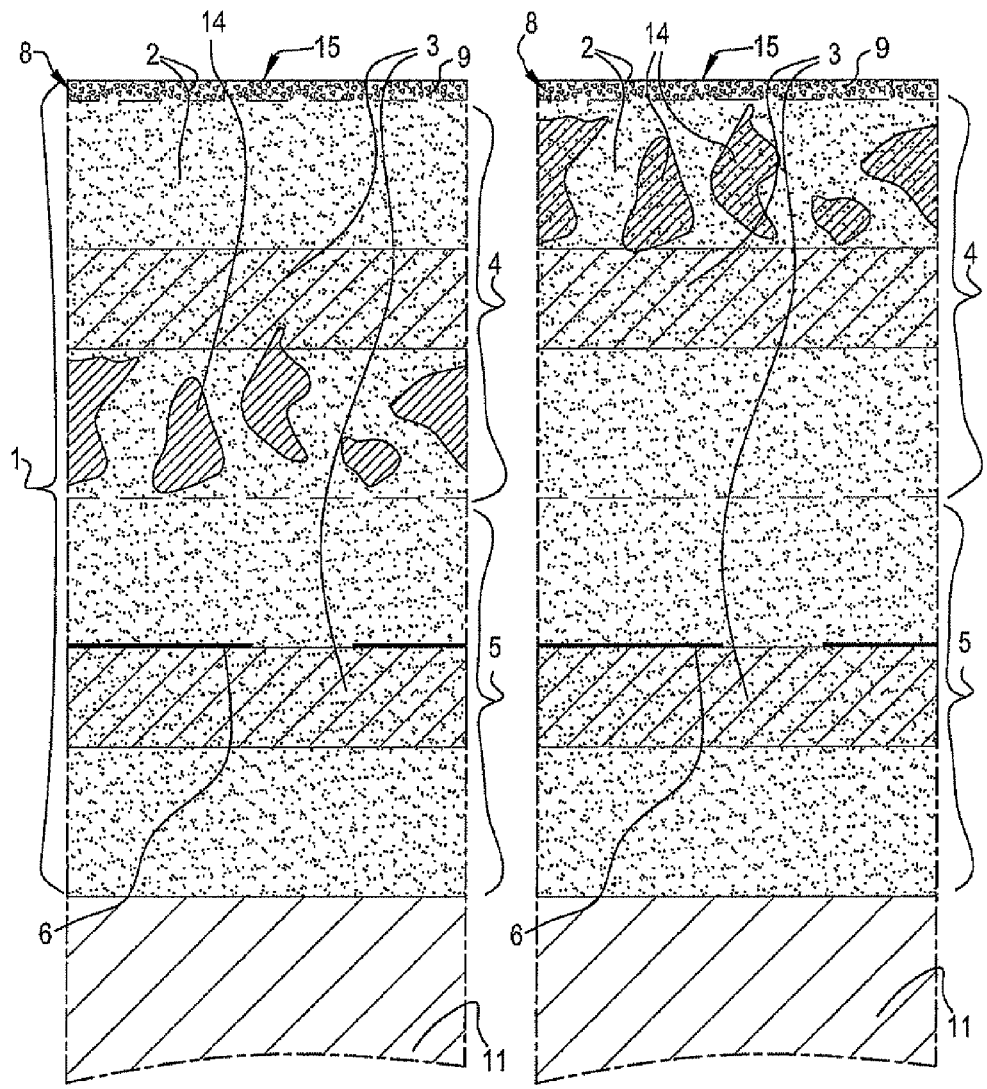
FIGS. 5 to 9 also represent examples of such panels.

FIG. 5 shows the result that may be obtained with the method of FIG. 2. It is clear that when pressing the respective material sheets 3, a possible migration of the hard particles 9 and/or 14 may occur. FIG. 5, for example, shows that the resin 2 at the underside of the carrier sheet 3 of the overlay 4 and the resin 2 with which the particles 14 are provided migrate to a layer in which the particles 14 spread. Preferably, as represented, an excessive migration of the particles 9 towards the underlying structure is avoided and may be prevented, for example, by applying said covering layer 8 only after the resin-pre-treated material sheet 3 has dried somewhat.

FIG. 6 shows another variant, wherein larger hard particles 14 are present above the material sheet 3 of the overlay 4, however, wherein the surface 15 of the laminate panel still substantially is formed by said particles 9 comprised in the covering layer 8.

Figure 7:
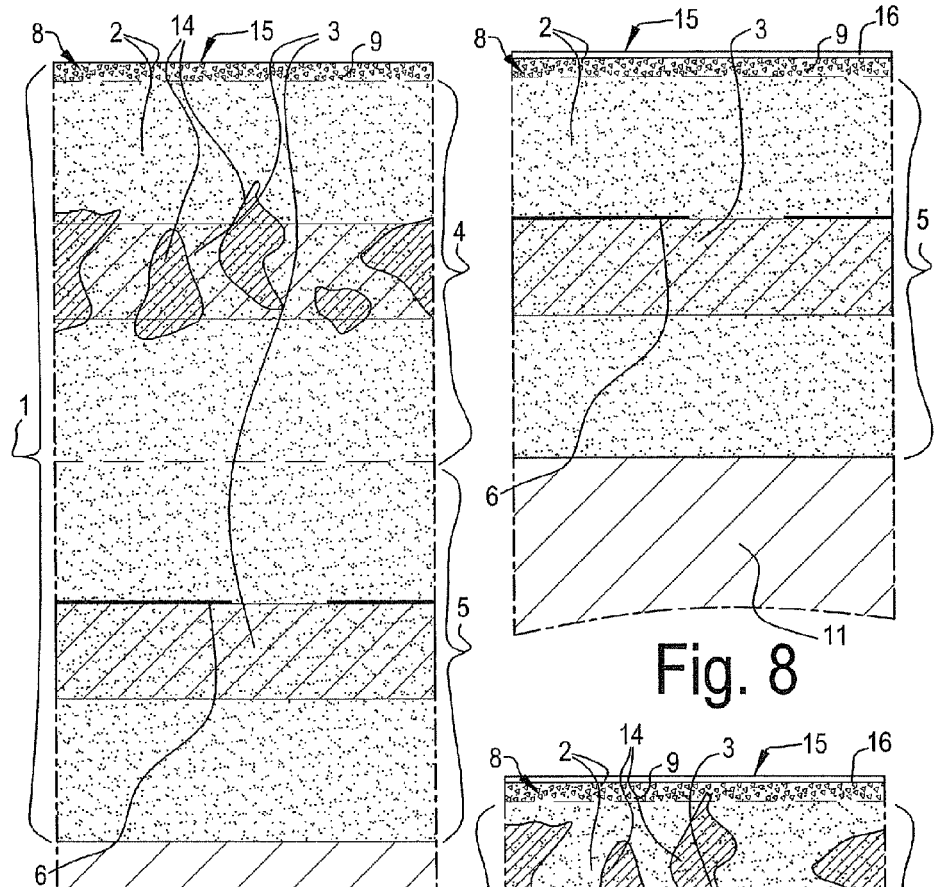

FIG. 7 shows a variant, wherein hard particles 14 are present in the material sheet 3 itself of the overlay 4. This may be achieved, for example, when a material sheet 3 is applied where, during the production thereof, for example, the production of the paper of which this material sheet 3 consists, hard particles 14 are integrated therein.

Figure 8:
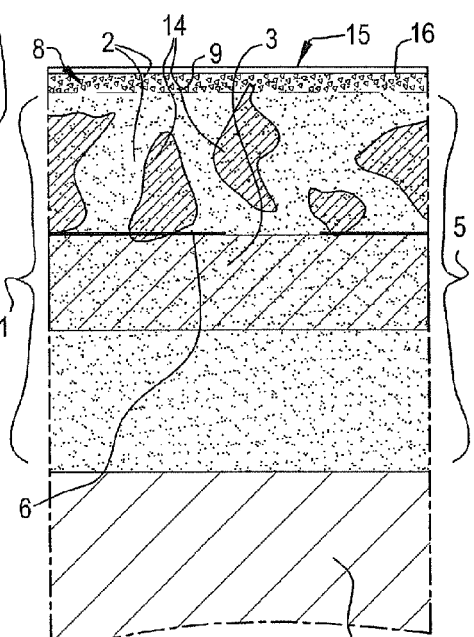
Figure 9:
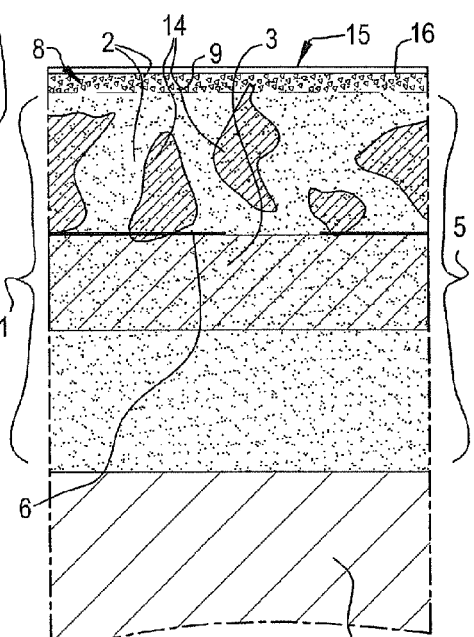

FIG. 8 shows a variant of a laminate panel wherein the top layer 1 above the print 6 or the printed decor does not comprise any extra material sheets 3, such as overlays 4. FIG. 9 also shows such a variant, wherein, apart from the particles 9, for example nano-particles, provided via the covering layer 8, also larger hard particles 14 are provided above the print 6 or the printed decor, which particles then are situated substantially below the smaller particles 9.

The larger hard particles 14 in the example of FIGS. 5, 6, 7 and 9 preferably have an average size between 20 and 200 micrometers, and still better between 60 and 160 micrometers.

It is noted that the material sheets 3 in the represented examples are only schematically depicted and that in reality, the ratio between the thickness of such carrier sheet and the overall thickness of the top layer may deviate from the ratio applied in the figures. The same is valid for the represented dimensions of the hard particles 9 and 14. For not-restricting examples of practical dimensions of the particles 9 and 14, reference is made to the description in the introduction.

Further, it is noted that, according to a variant not represented in the figures, it is not excluded to incorporate material sheets in the top layer which are not or almost not provided with resin, and/or which solely have a radiation-hardening covering layer. Possibly, the top layer itself may consist solely of such material sheets. In this latter case, the production process is significantly shortened, as in such case it is redundant to provide the respective material sheets with resin.

As shown in FIGS. 8 and 9, the covering layer 8 may be protected further by means of one or more extra material sheets 16, whether or not provided with resin or other synthetic material.

The present invention is in no way limited to the above-described embodiments; on the contrary, such methods and panels may be realized according to various variants, without leaving the scope of the present invention.

The invention claimed is:

1. A method for manufacturing panels composed at least of an MDF or HDF substrate and a top layer including at least one material sheet provided with a thermo-hardening resin, the at least one material sheet including a print sheet provided with a print defining the uppermost material sheet in the top layer, the method comprising the steps of:
   providing the print sheet with the thermo-hardening resin;
   providing the print sheet with a radiation-hardening covering layer and including hard particles;
   providing at least one further layer of hardened substance above the covering layer;
   forming a covered substrate, after providing the print sheet with a radiation-hardening covering layer, by bringing the at least one material sheet together with the substrate into a press, the at least one material sheet and the substrate are exposed to increased pressure and temperature by a press element and are mutually bonded to form said covered substrate;
   wherein the overall concentration of hard particles in the top layer of the panels is between 3 and 30 grams per square meter.

2. The method of claim 1, wherein additional hard particles are provided in the top layer at a location above the print layer.

3. The method of claim 2, wherein the additional hard particles have a larger average grain size than the hard particles located in the radiation-hardening covering layer.

4. The method of claim 1, wherein the covering layer includes a substance that hardens under the influence of ultraviolet light or electron beams.

5. The method of claim 1, wherein said hard particles comprise ceramic or mineral particles.

6. The method of claim 1, wherein said hard particles have an average grain size of between 30 nanometers and 30 micrometers.

7. The method of claim 1, wherein the panel relates to a laminate panel and the sheet having the print is a paper sheet having a weight between 65 to 150 grams per square meter.

8. The method of claim 1, wherein structure, relief or other impressions are provided in at least the covering layer.

* * * * *